Aug. 6, 1963

S. E. BORG 3,100,256

AUTOMATIC WELDING APPARATUS

Filed March 16, 1961

INVENTOR.
S. EDWARD BORG
BY Kenway, Jenney & Hildreth
ATTORNEYS

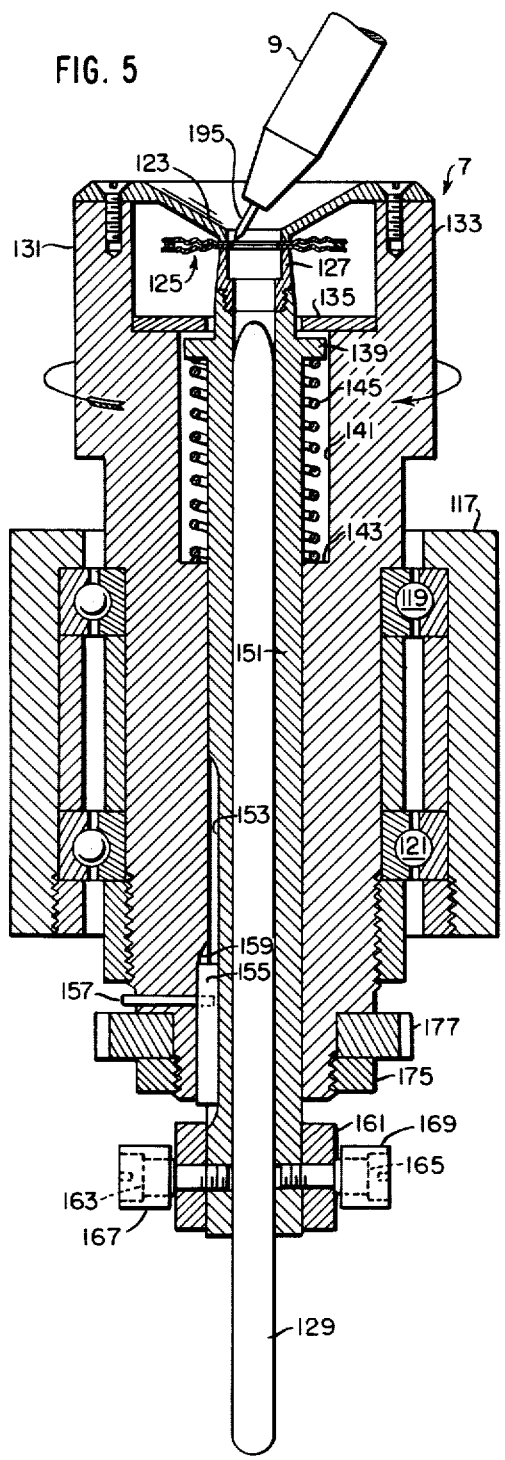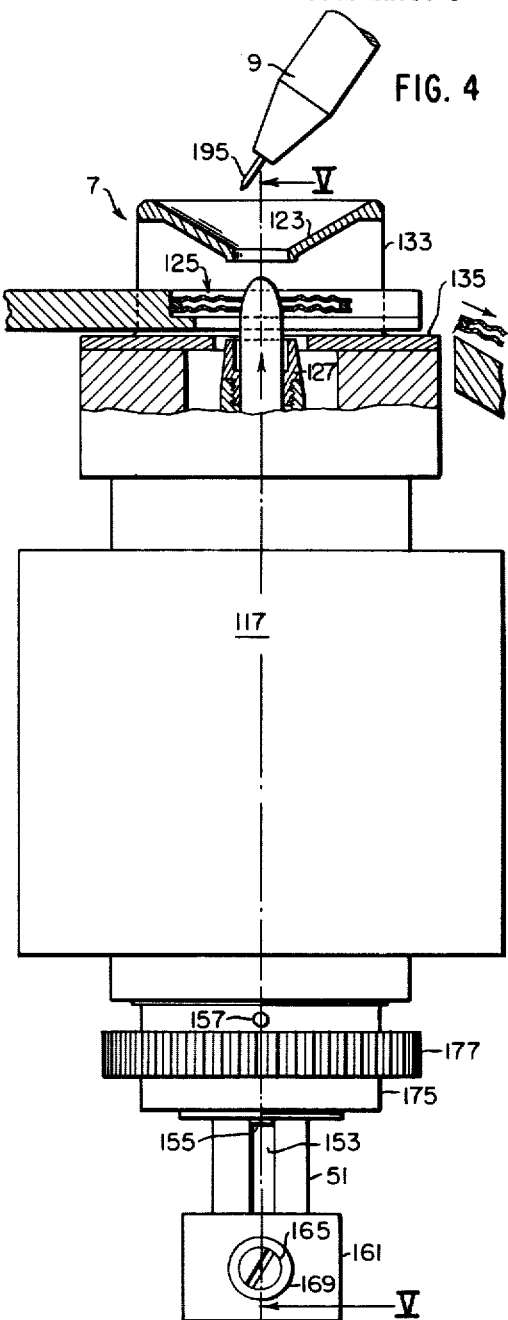

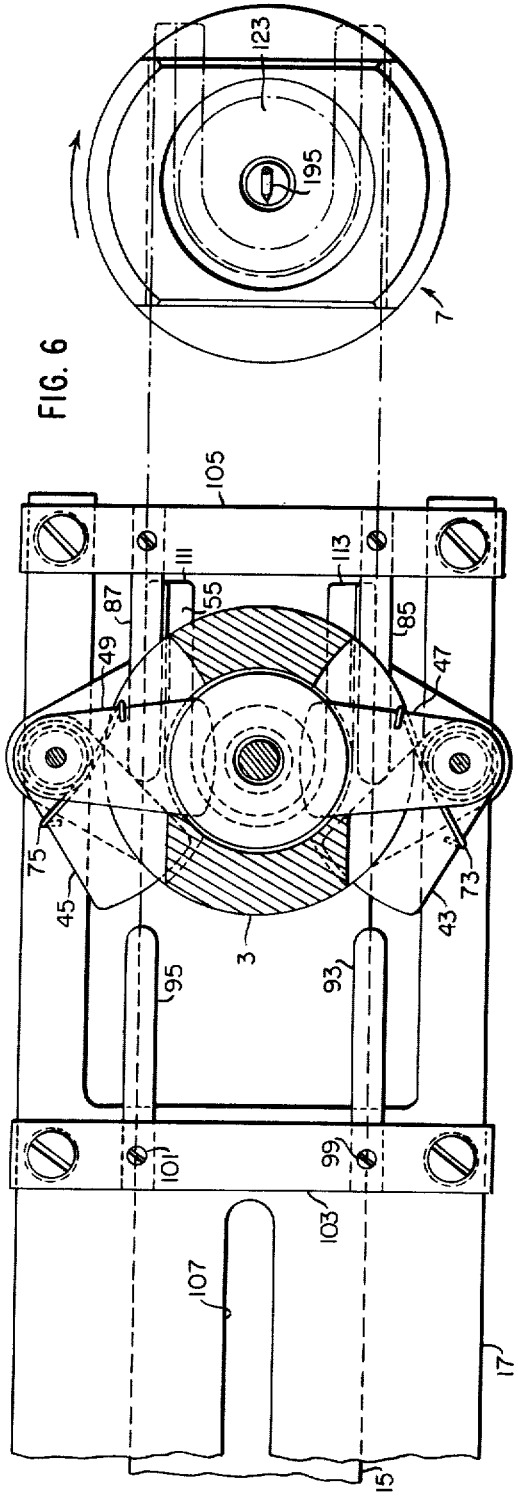

Aug. 6, 1963

S. E. BORG 3,100,256

AUTOMATIC WELDING APPARATUS

Filed March 16, 1961

INVENTOR.
S. EDWARD BORG
BY Kenway, Jenney & Hildreth

ATTORNEYS

Aug. 6, 1963 S. E. BORG 3,100,256
AUTOMATIC WELDING APPARATUS
Filed March 16, 1961 7 Sheets-Sheet 7

INVENTOR.
S. EDWARD BORG
BY Kenway, Jenney & Hildreth

ATTORNEYS

United States Patent Office 3,100,256
Patented Aug. 6, 1963

3,100,256
AUTOMATIC WELDING APPARATUS
Sune Edward Borg, Westwood, Mass., assignor to Northrop Corporation, Beverly Hills, Calif., a corporation of California
Filed Mar. 16, 1961, Ser. No. 96,167
17 Claims. (Cl. 219—124)

My invention relates to automatic welding apparatus, and particularly to improved apparatus for welding together the individual convolutions of a metallic bellows.

Metallic bellows are used in large numbers, and in a wide variety of applications, as pressure transducers. A common technique for making such bellows has been to form a deep cup from a flat plate and then to hydroform the cup into the desired bellows shape. However, bellows produced by welding together individual convolutions have a number of advantages over hydroformed bellows. When welding is employed, a wide range of internal and external diameters may be produced with relatively simple and inexpensive plant facilities. In addition, the thickness of the bellows material may vary over a wide range. This flexibility makes it possible to specify various spring rates for the completed bellows without re-tooling. In addition, a larger class of materials can be employed, and these materials can be heat-treated to attain high yield strength, or can be specifically selected for use in highly corrosive atmospheres. Also, the convolutions in a welded bellows may be nested more closely than is possible in a hydroformed bellows, with the result that welded bellows may be made very compact and still have a high extension range.

Formerly, the manufacture of welded bellows has been a time consuming operation, requiring elaborate jigs and fixtures and highly skilled welders. It is the object of my invention to reduce the time required for the manufacture of welded bellows, and to eliminate the requirement for highly skilled operators.

Briefly, my invention comprises a first automatic welding unit provided with means for storing pairs of bellows convolutions, a slide for transferring the pairs successively to a welding turret, and apparatus for automatically positioning each pair of bellows in the turret in proper proximity to an electrical welding torch. The unit includes means for rotating the turret and energizing the torch when each pair of convolutions reaches the proper position, to weld together their inner peripheries, and apparatus for removing the welded pair and replacing it with another pair when the welding operation has been accomplished. The only operations required on the part of the operator in this phase of the welding operation are to load the convolutions, remove the welded bellows, and operate a manual switch to start or stop the operation. The final welding of the bellows is performed in a second unit of my invention, in which a desired number of pairs of convolutions having their inner peripheries welded together are stacked on a spindle, properly spaced by chill rings, and clamped to position their outer peripheries properly for welding. This unit includes apparatus for automatically advancing the spindle relative to a welding torch, and means for rotating the spindle when each seam, comprising the line of junction of the outer edges of a pair of confronting convolutions, is in proper proximity to the welding torch to weld the seam. In this phase of the operation, the operator is merely required to load and unload the apparatus, and to manipulate a spring-returned push button to initiate the first weld.

The detailed structure and operation of the automatic welding apparatus of my invention will best be understood by reference to the accompanying drawings, together with the following detailed description, of a preferred embodiment thereof.

In the drawings,

FIG. 2 is a side elevation, partly in cross section and with parts removed, of the apparatus of FIG. 1;

FIG. 3 is a fragmentary cross-sectional view of a friction plug assembly employed in the apparatus of FIGS. 1 and 2, taken essentially along the line III—III in FIG. 2;

FIG. 4 is an enlarged view, partly in cross section, of a welding turret employed in the apparatus of FIGS. 1 and 2;

FIG. 5 is a cross sectional elevation of the turret of FIG. 4, taken essentially along the line V—V in FIG. 4 but showing the welding torch of FIG. 4 in a different position;

FIG. 6 is an enlarged fragmentary plan view, with parts removed, parts broken away, and parts in section, of the apparatus of FIGS. 1 and 2, showing the welding turret, a portion of the slide, and an escapement employed for loading the slide;

FIG. 7 is a fragmentary elevational view, partly in cross section, of the escapement of FIG. 6;

FIG. 8 is a schematic wiring diagram of a control circuit employed in the apparatus of FIGS. 1 and 2;

Figure 1:
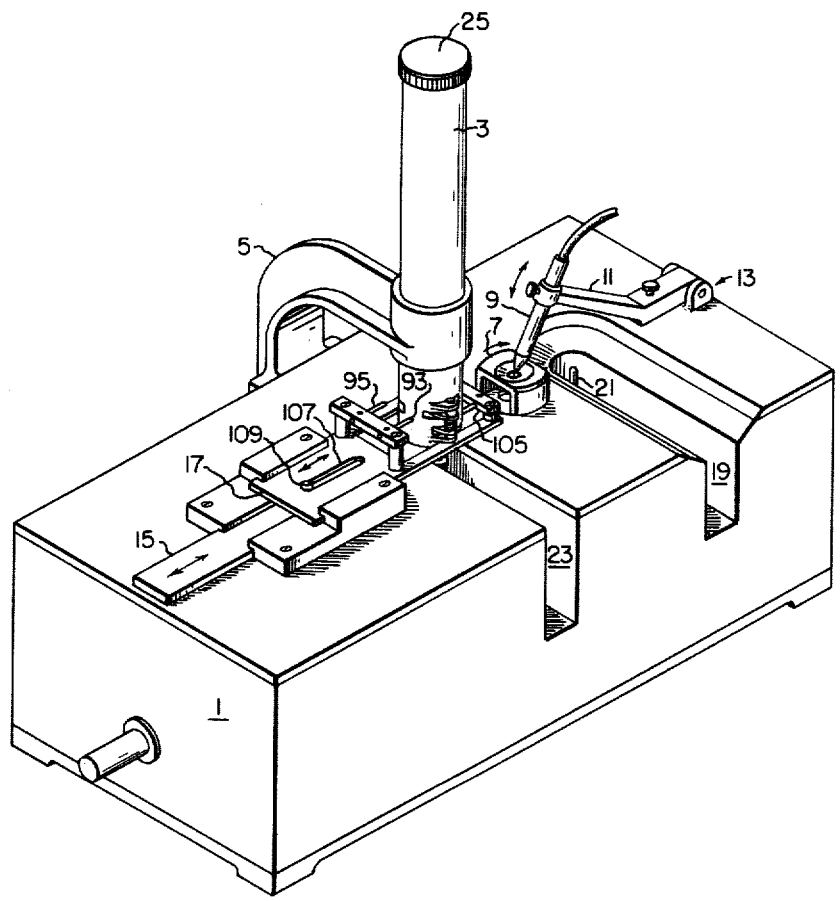
FIG. 1 is a perspective sketch of apparatus in accordance with my invention for automatically welding the inner peripheries of pairs of bellows convolutions.

Referring now to FIGURE 1, the inner periphery welding unit of my invention comprises elements mounted on a table generally designated as 1, above which a magazine such as a loading tube 3 is suspended by conventional means such as a bracket 5. A rotatable welding turret 7 is journalled in the table for rotation about a vertical axis in the sense indicated by the arrow. An electric welding torch 9, which may be a conventional helium arc welder or the like, is mounted on an arm 11 pivoted to the table, by conventional means generally designated as 13, for movement between a raised position and an operating position in which the tip of the welding torch is properly positioned with respect to the inner peripheries of a pair of bellows convolutions mounted in turret 7 in a manner to be described. The convolutions are transferred from the loading tube 3 to the turret 7 by means of a slide 15, which actuates an escapement in loading tube 3 by means of an auxiliary slide 17, to be described. After the welding operation on each pair of convolutions is completed, they are delivered to a bay 19 in the table 1, in which a spindle 21 is mounted to receive them. Referring now to FIG. 2, in conjunction with FIG. 1, loading tube 3 is provided with a removable cap 25 formed with a guide plug 27 received within tube 3 and a spindle 29 on which the convolutions to be welded are stacked.

Figure 10:
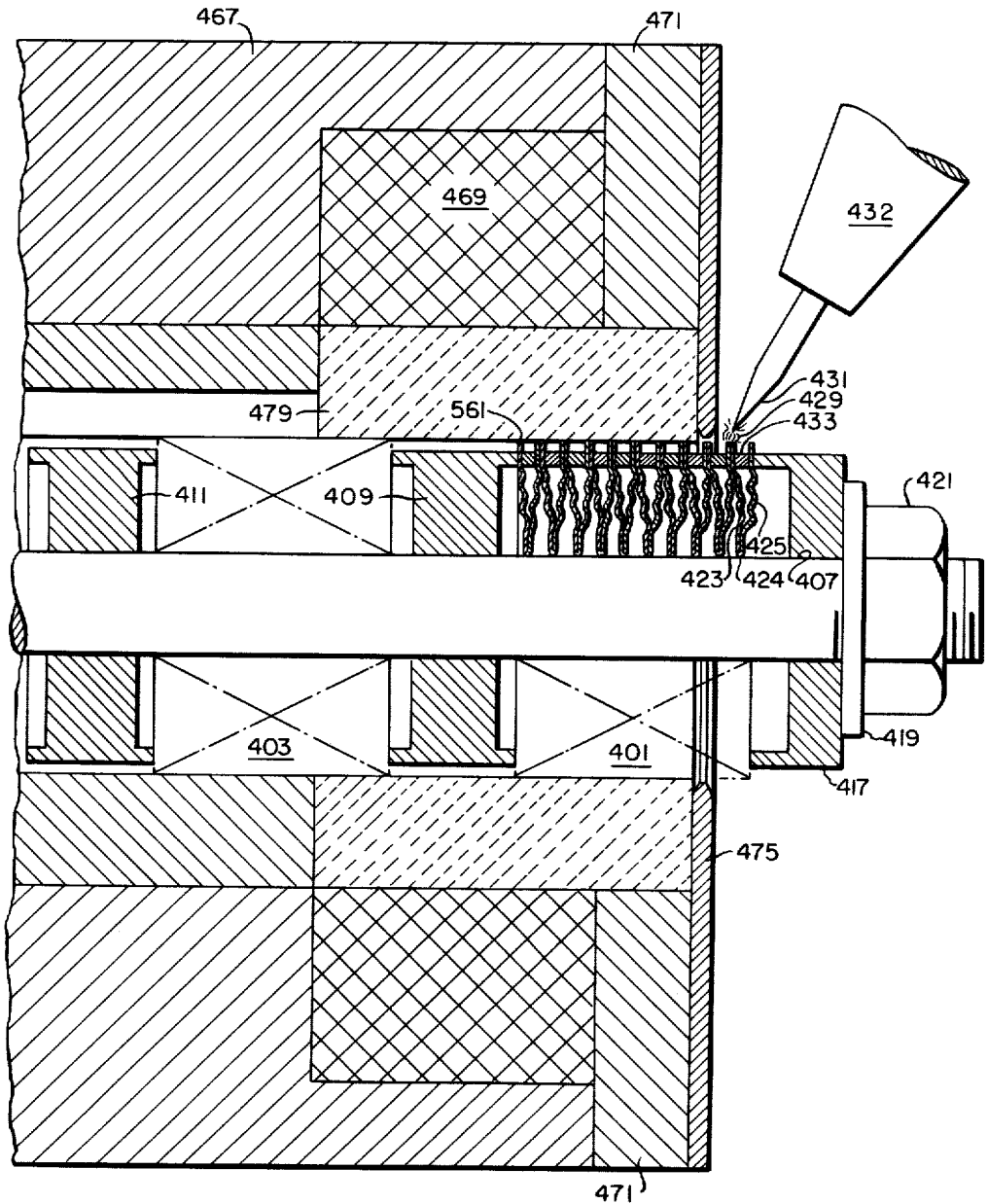
FIG. 10 is an enlarged view, partly in cross section, of the welding area of the apparatus of FIG. 9, showing details of the stacked bellows assemblies and the manner of securing the assemblies for welding.

Referring now to FIGS. 6 and 7, in conjunction with FIGS. 1 and 2, the spindle 29 is stacked with pairs of convolutions such as 31 and 33, each pair having a chill ring 35 disposed to space the outer diameters of the convolutions. As best shown in FIG. 10, each convolution comprises a circular plate having a circular central aperture, and formed with annular ridges in a conventional manner. Between each pair of convolutions is a spacer plug, illustrated by typical spacer plugs 37 and 39 in FIG. 7. Initially, the desired number of convolutions and spacer plugs are placed on the spindle 29, where they may be held temporarily by any suitable expedient such as a rubber friction washer, not shown, placed on the end of the spindle, and the cap 25 is then placed in the position shown in FIG. 2, whereafter the stacked convolutions will be retained by the escapement to be described, and the temporary retaining washer may be tapped off and removed through the bottom of the loading tube 3.

As shown in FIGS. 6 and 7, the escapement for delivering the convolutions comprises a lower set of blades 43 and 45 and an upper set of blades 47 and 49. The upper blades 47 and 49 are shown in locking position, in which they engage a shoulder on one of the spacer plugs such as 39. The lower blades 43 and 45 are shown in retracted position, in which position they would release the pair of convolutions 51 and spacer plugs 53 from a position shown in dotted lines to the position shown in full lines, where the convolutions 51 would be supported by a land 55 on the slide 15. If desired, the end of slide 15 on which the arcuate land 55 is formed can be made separate, and attached to the body of the slide by removable means such as screws, so that various sizes of convolutions can be handled on the same machine by simply attaching an end having an arcuate land of the proper radius.

When the convolutions 51 are released and drop onto land 55, the spacer plug 53 drops through the slide and is received on a spindle 57 located in bay 23, as best shown in FIGS. 1 and 2.

The blades 43 and 45 of the escapement are each provided with hubs 59 and 61, respectively, which are journalled on pins 63 and 65, respectively. Pins 63 and 65 are journalled at their extremities in a plurality of lugs 67 formed on the loading tube 3. Upper blades 47 and 49 are provided with hubs 69 and 71, respectively, journalled on pins 63 and 65, respectively. A spring 73 is disposed about hub 59 and interconnects blades 43 and 47 in the manner shown in FIGS. 6 and 7, and a similar spring 75 is disposed about hub 61 and interconnects blades 47 and 49. In this manner, both the upper and lower blades are urged to a locking position by the springs. Suitable stops, not shown, are provided by limiting the slots 81 and 83 in tube 3 in which blades 47 and 49 travel to prevent them from following the lower blades 43 and 45 when these are deflected by pins 85 and 87, which are mounted on auxiliary slide 17 in a manner to be described. Similarly, the lower slots 89 and 91 in which blades 43 and 45 travel are limited at one side to prevent blades 43 and 45 from following the upper blades 47 and 49 when they are actuated by pins 93 and 95, which are also mounted on slide 17.

Referring now to FIG. 6, in conjunction with FIGS. 1 and 2, pins 93 and 95 are adjustably mounted by means such as set screws 99 and 101 in a bridge 103 secured to an auxiliary slide 17. Similarly, pins 85 and 87 are adjustably secured to a bridge 105 mounted on slide 17. Slide 17 is provided with a slot 107 in which a pin 109 secured to the slide 15 travels, such that during travel of slide 15 to the right in FIG. 2, pin 109 will engage the inside end of the slot and drive pins 93 and 95 into engagement with upper blades 47 and 49, and during the back stroke, to the left in FIG. 2, of slide 15, slide 17 will be moved to the position shown in FIG. 6 in which pins 85 and 87 retract blades 43 and 45. Thus, at the end of the back stroke of the slide 15, which is the position shown in FIGS. 2 and 3, the lower blades 43 and 45 are actuated to drop one spacer plug such as 53 through the hole in slide 15, and to drop one pair of convolutions such as 51 on the land 55 of slide 15. The forward stroke of the slide, to the right in FIG. 2, carries this pair of convolutions 51 into the turret 7, and at the same time ends 111 and 113 of the slide 15 carry a welded pair of convolutions into bay 19 in a manner to be described. Near the end of the forward stroke of slide 15, slide 17 is actuated by pin 109 to move pins 93 and 95 into engagement with upper blades 47 and 49 to release a spacer plug such as 39 and a second pair of convolutions such as 31 and 33 to a position in which they will be held by slides 43 and 45. It will thus be apparent that on succeeding motions of the slide, the escapement will load a new pair of convolutions on the slide at each return to the position shown in FIG. 2.

Referring now to FIGS. 4 and 5, the welding turret 7 is shown in more detail. Comparing these figures with FIG. 2, the turret 7 is carried in bearings formed in a collar 117 which is in turn secured to the table. These bearings such as 119 and 121 permit rotation of the turret 7 about a vertical axis.

Attached to turret 7, by any suitable removable means such as the screws shown, is an upper chill 123 against which a pair of convolutions such as 125 is clamped by a lower chill generally designated as 127 which is threaded into a shaft 151. A spindle 129 is concentrically mounted in a central aperture in chill 127 as shown, for purposes to be described. Since chills 123 and 127 are removable, a number of sizes can be stocked to adapt the machine to various sizes of bellows convolutions.

Referring now to FIGS. 4 and 5 in conjunction with FIG. 1, the upper chill 123 is supported on turret 7 by a bridge comprising side members 131 and 133 formed integral with the turret. A plate 135 is secured to the turret 7 to form a stop for a collar 139 formed on lower chill 127. A bore 141 in turret 7 terminates a shoulder 143, and a spring 145 is mounted between collar 139 and shoulder 143 to urge the lower chill 127 up into engagement with the upper chill 123.

Chill 127 is attached to an extended cylindrical shaft 151, which is splined as shown at 153 and keyed to turret 7 by a key 155 held in position by a pin 157, the key mating with a corresponding spline 159 in the lower end of turret 7. At the lower portion of the shaft 151 is mounted a collar 161, as by bolts 163 and 165 carrying bearing sleeves 167 and 169. As shown in FIG. 2, the upper portions of the bearings 167 and 169 are adapted to be engaged by the arms of a fork 171 forming an extension of a shaft 173. In a manner to be described, shaft 173 is at times reciprocated to raise the chill 127 to pick up a pair of convolutions and hold them against the upper chill 123, or to lower chill 127 to release a welded pair of convolutions.

Mounted at the lower end of turret 7, as by a threaded nut 175, is a drive gear 177. As shown in FIG. 2, gear 177 is adapted to be driven by a corresponding gear 179 which is connected by means of shaft 181 to a gear 183. Gear 183 is driven by a worm 185 on the output shaft of a turret drive motor TM. Also actuated by shaft 181 is a circuit controller C1, shown schematically in FIG. 8, and an electromagnetic detent comprising a disc 187 formed with a detent notch 189, as best shown in FIG. 8, adapted to be engaged by the armature of solenoid 191.

Turning now to FIG. 2, as previously described, welding torch 9 is supported by an arm 11 pivoted to the table 1 as indicated at 13. Arm 11 is provided with a stop screw 193 adjustable to position the tip 195 (FIG. 5) of the welding torch in the proper welding position when the arm 11 is lowered. As shown, a similar set screw is used to attach the torch to arm 11, so that the two screws provide adjustment of both vertical and horizontal positions. A rod 197 extends through a hole 199 in the top of the table 1, and through a hole in a bracket 201 secured to the side of the table, as shown in FIG. 2. Rod 197 is provided with an adjustable stop collar 198 to limit its downward motion, and adapted to be raised to raise arm 11 and pull torch 9 out of turret 7 when engaged by face 203 on a cam 205 slidably mounted in the table for reciprocation, from the position shown in full lines in FIG. 2 to the position indicated in dotted lines in FIG. 2, by suitable guide means, not shown. A second cam face 207 on cam 205 is adapted to engage spindle 129 in turret 7 for a purpose to be described.

Referring again to FIG. 2, slide 15 is provided with a projection 209 which extends through a slot 211 formed in the top of table 1. A rod 213 extends through a hole formed in projection 209 and through a corresponding hole formed in an arm 215 of a rack generally designated as 217, as shown, and rod 213 is held in place by a pair of nuts 219 and 221 threaded thereon at the extremities thereof. A spring 223 is interposed between arm 215 and projection 209, surrounding bolt 213. Spring 223 is of sufficient strength that slide 15 may be driven by arm 215 without appreciable compression of spring 233 until the slide projection 209 reaches the right hand end of slot 211, whereafter the arm may continue to travel independently of the slide 15 with accompanying compression of the spring 223. Rack 217 is adapted to be driven by a gear 225 on a shaft 227 driven by a gear 229 that is mounted thereon, as shown in dotted lines in FIG. 2. Gear 229 is driven by a worm 231 on the output shaft 233 of a slide motor SM, also shown in FIG. 8.

A pair of pins 235 and 237 carried on rock 217 at times actuate a toggle switch 239 having an arm 241. The toggle switch is mounted on the table in any suitable conventional manner.

A projection 243 on rack 217 rides in an elongated notch 245 formed in cam 205, and drives the cam between the position shown in full lines and the position indicated in dotted lines when it engages the appropriate end of the notch 245.

As shown in FIGS. 2 and 3, shaft 173 extends through a hole bored in rack 217. Shaft 173 is provided with an extension 251 having a stop nut 253 at the end thereof, such that the motion of shaft 173 is limited in its travel to the left by a shoulder 255 formed at the juncture of the main portion of the shaft and the extension 251, and is limited in its travel to the right by stop nut 253.

As shown in FIG. 3, rack 217 and shaft 173 are splined and secured together against relative rotation by means of a key 271. As will appear, it is desirable that shaft 173 move with rack 217 over a portion of travel of the latter, and for this purpose the shaft is frictionally secured to the rack by means of a friction plug 273 engaged by a spring 275, the latter being secured in place by a threaded plug 277 as shown.

A circuit controller comprising a switch 255 is mounted on a housing 257 for the gears associated with slide motor SM, and is adapted to be actuated on the backstroke of slide 15 by a pivoted dog 259 which engages an actuating roller 261 of switch 255 on the backstroke, but which rolls over roller 261 without actuating the switch on the forward or right hand stroke of slide 15. As best shown in FIG. 8, when actuated, switch 255 grounds a lead 263 to complete an operating circuit for turret motor TM.

Refer now to FIG. 8, in which the control circuit for the turret motor TM and the slide motor SM is shown. Considering first the turret motor TM, this motor is energized by a circuit extending from one terminal of a conventional A.C. source 287 through the winding of the motor, and thence to ground and the other terminal of source 287 through two parallel circuits. The first of these extends over lead 263 and through switch 255 to ground. The switch is briefly closed during the backstroke of the slide 15. The second circuit extends to conductive segment 289 of circuit controller C1, which is engaged by a conductive wiper 291 driven by the shaft of motor TM. This circuit is completed over most of a rotation of motor TM, and is open when motor TM is stopped in a reference position marking the end of a complete revolution. In the stopped position, a circuit between wiper 291 and a contact 295 is completed, which energizes a solenoid 191 through a suitable source of voltage such as a battery 297. When the solenoid is energized, its armature engages the notch 189 in detent disc 187 to hold the shaft of motor TM in its reference position.

Motor SM may be a conventional split-phase A.C. motor, having a first winding 303 connected to a source of alternating current through a phasing capacitor 305, and second winding 307 having a first terminal which is grounded, and a second terminal which is connected to the armature of toggle switch 239. The armature of toggle switch 239 has a first contact *a* connected to one side of the secondary winding of a transformer 285, and a second contact *b* connected to a wiper 315 driven by motor TM, the wiper engaging a contact 293 at the reference position of the shaft of motor TM to complete a circuit to the other side of the secondary winding of transformer 285.

The primary winding of transformer 285 is energized by a suitable source of alternating voltage. The secondary winding is center tapped, and is returned to ground through a manual switch 309. The arrangement is such that with manual switch 309 closed, if arm 241 of toggle switch 239 is in the position shown, and motor TM is in its reference position, a voltage of the proper phase to rotate motor SM in the direction moving rack 217 to the right will be supplied from transformer 285 to winding 307 of motor SM. At the end of the stroke, pin 285 will throw toggle switch 239 to its opposite position, to supply a voltage of opposite phase to motor SM to drive rack 217 to the left.

As indicated schematically in FIG. 8, the welding torch may be energized in a conventional manner from a welder 313 of conventional design, when a circuit from a battery 314 is completed over wiper 291 and segment 289 of circuit controller C1. Thus, the welding torch will be energized when turret motor TM is rotating. Although not shown, it is to be understood that the welding circuit will be completed by a ground connection to turret 7 of table 1, in a conventional manner. Also, the battery 314 could either energize the torch directly, or, if desired, energize a relay in welder 313 to control the supply of energy to the welding torch.

This portion of the apparatus of my invention having been described, its operation will next be described. First, loading tube 3 is loaded with a stack alternately comprising pairs of convolutions and spacer plugs as shown in FIG. 7. Let it be assumed that the slide is in the position shown in FIG. 2, and that switch 309 in FIG. 8 is initially open. Referring to FIG. 7, it will be apparent that the first spacer plug such as 39 will be held by locked blades 47 and 49, and it will be assumed that there are no previous convolutions already in loaded position. Thus, either the apparatus can be made to go through one blank cycle, or if desired pin 109 on slide 15 can be temporarily removed and slide 17 moved manually to operate the escapement and drop the first set of convolutions down on the land 55 of slide 15. Assume that the latter has been done, a convolution is on the slide, and the first spacer plug such as 53 has dropped down on the spindle 57 in bay 23. Next, assume that switch 309 is closed. With rack 217 in its left-hand position as shown, arm 241 of toggle switch 239 will have been actuated to engage contact *b* of the toggle switch. With motor TM stopped, wiper 315 engages contact 293, and a circuit is completed to energize winding 207 of motor SM with a voltage of the proper phase to drive the rack to the right in FIG. 2.

With motor TM in the position shown, it would be energized through circuit controller C1 and continue to rotate until it reaches its reference position, in which contact 295 is grounded and the energizing circuit for motor TM is open. At this time, solenoid 191 will be actuated, and motor TM will be held in its reference position. At the same time, the circuit for motor SM will be completed through contact 293 and wiper 315, and rack 217 will begin to move to the right in FIGS. 2 and 8. As rack 217 moves to the right, shaft 173 will be driven through friction plug 273 (FIG. 3), and slide 15 will be driven through spring 223.

The next operation of significance is the engagement of fork 171 with bearings 167 and 169 attached to lower chill 127, as shown in FIGS. 2 and 5. The lower chill 127 will then be pulled down to the position shown in FIG. 4. Shortly, thereafter, as slide 15 continues to move to the right, the slide will enter under the transverse opening in turret 7 formed up uprights 131 and 133 (FIGS. 4 and 5), and the slide will stop due to engagement of projection 209 with the end of slot 211 (FIG. 2). The pair of convolutions will then be positioned over the lower chill 127 substantially as shown in FIG. 4, except that spindle 129 will be in the lowered position rather than in a partially raised position as shown.

After fork 171 has fully lowered chill 127, it will continue to move, dwelling on the bearings, until shaft 173 is stopped by the engagement of stop nut 253 with table 1, and rack 217 will continue to travel, with resulting motion between the shaft 173 and friction plug 273 and compression of spring 223. During this over-travel portion of the rack stroke, projection 243 on rack 217 will engage the right hand end of notch 245 in cam 205. The resultant motion of cam 205 accompanying the end of the stroke of rack 217 will raise rod 197 to bring torch 9 out of the way, and simultaneously raise spindle 129 to center the convolutions such as 125 as shown in FIG. 4, and to hold the convolutions in position. The spindle 129 will raise sufficiently that the convolutions will be guided throughout their later movement up into engagement with upper chill 123, and concentric with the center line of turret 7.

At the end of the forward stroke, pin 235 on rack 217 will engage arm 241 of toggle switch 239 and flip it into engagement with its contact *a* (FIG. 8). This will reverse motor SM, causing the rack to travel to the left. During the stroke of slide 15 to the right, pin 109 (FIG. 2) will engage the right hand end of slot 107 in auxiliary slide 17, causing pins 85 and 87 (see FIG. 6) to release blades 43 and 45 to their locking position, and pins 93 and 95 will retract upper blades 47 and 49 to release a spacer plug and the next pair of convolutions, such as these will drop down and be held by the lower blades 43 and 45.

As slide 15 moves to the left, shaft 173 will be moved to the left and fork 171 will begin to move to the left, but sufficient dwell is provided on the fork so that it will not begin to release lower chill 127 until the slide 15 is clear of the turret 7. When this occurs, referring now to FIG. 5, the lower chill 127 will move up, carrying the convolutions being guided at this time by the raised spindle 129. Next, projection 243 on rack 217 will engage the left hand end of notch 245 in cam 205, and cam 205 will be moved to the left, lowering spindle 129 and rod 197. Welding torch 9 will now be lowered to welding position.

The next operation, occurring during the movement of slide 15 to the left, will be the engagement of dog 259 with roller 261 to close switch 255. Motor TM will not be energized, and will override the solenoid 191 and begin to drive turret 7. At the same time, the circuit for welder 313 is completed through battery 314, and welding of the inner peripheries of the pair of convolutions which is in position, such as convolutions 125 in FIG. 5, can take place. Referring briefly to FIG. 2, gears 177 and 179 are so proportioned that turret 7 will rotate one and one-half revolutions for each revolution of gear 179, corresponding to one revolution of disc 187, wiper 315, and wiper 291. The additional half rotation of turret 7 is provided to ensure a complete weld.

Motor SM will continue to rotate, carrying slide 15 to its left-hand position. At the end of the backstroke, arm 241 of toggle switch 239 will be operated to open its contact *a* and close its contact *b*. However, motor SM will not start until the turret motor TM completes its revolution. In the meantime, projection 109 on slide 15 has engaged the left end of slot 107 in auxiliary slide 117 to carry pins 85 and 87 (FIG. 6) into position to actuate blades 43 and 45 of the escapement to drop the next pair of convolutions into position on land 55 of slide 15.

As soon as motor TM reaches its reference position, solenoid 191 will be energized and wiper 315 will engage contact 293 to complete the circuit from motor SM so that the motor can begin to drive rack 217 to the right.

The succeeding cycle of operation will be the same as that just described, except that there is now a finished convolution in the turret 7, and when lower chill 127 is pulled down by fork 171, the finished convolution will drop down ahead of slide 15 and be pushed ahead by projections 111 and 113 (FIG. 6) so that the finished convolution drops onto spindle 21 in bin 19, as can be seen in FIGS. 2 and 4. The cycle of operation just described can be repeated until the loading tube 3 is empty, at which time the operator can open manual switch 309 in FIG. 8, and remove cap 25 in FIG. 2 to reload the slide. At the same time, the welded convolutions can be removed from bin 19 and the spacer plugs can be removed from bin 23 for re-use.

Figure 9:
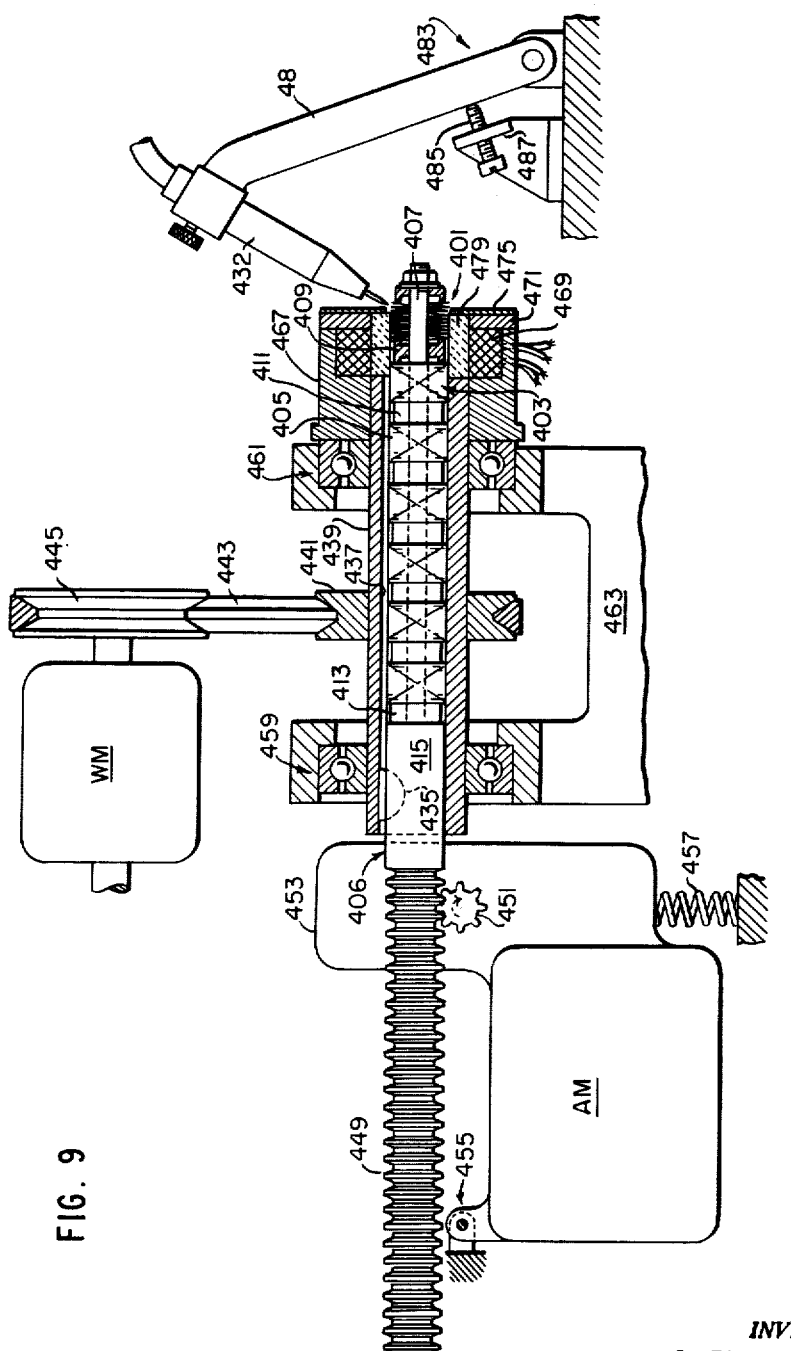
FIG. 9 is an elevation, partly in cross section, of apparatus in accordance with my invention for automatically welding the outer peripheries of confronting convolutions of a bellows assembly.
Figure 11:
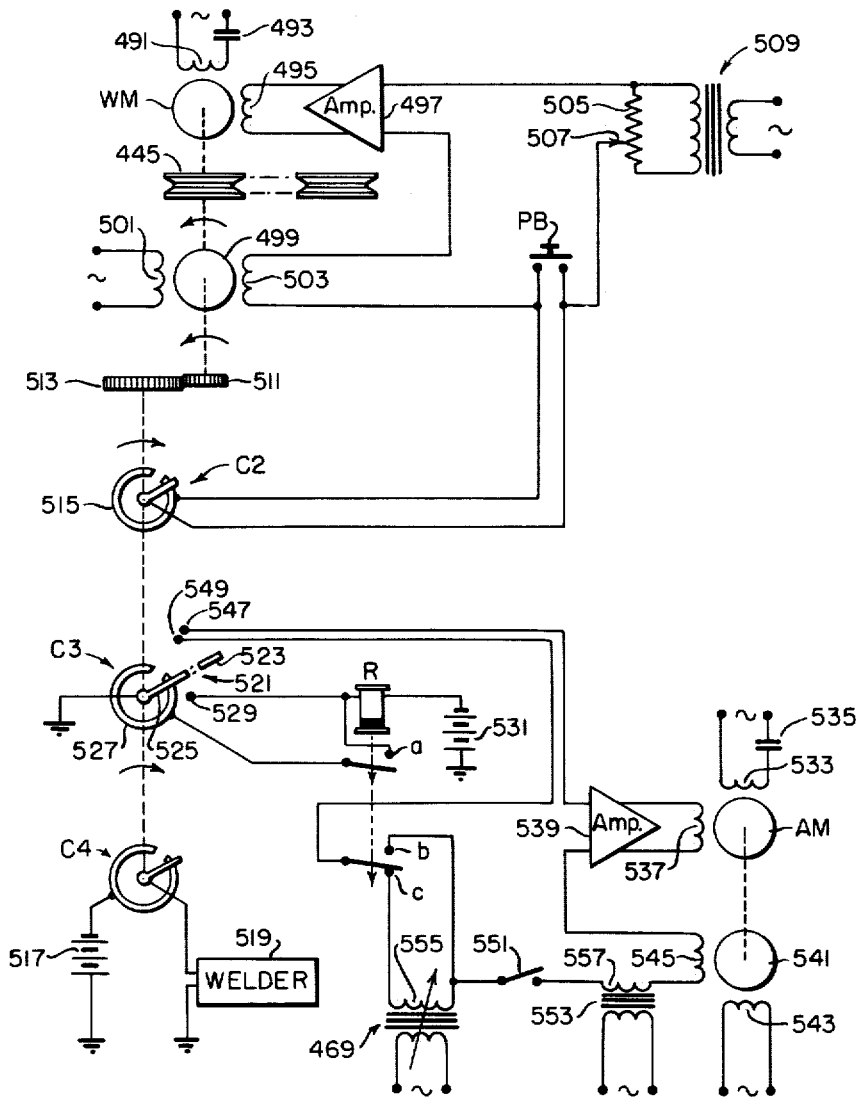
FIG. 11 is a schematic wiring diagram of a control circuit employed in the apparatus of FIG. 9.

The apparatus for completing the manufacture of the bellows is shown in FIGS. 9, 10 and 11. As best shown in FIGS. 9 and 10, groups of convolutions such as 401 and 403 are stacked on spindle 407 forming a portion of a slide generally designated as 406, and are spaced by chill spacers such as 409 and 411. The end spacer 413 (FIG. 9) is secured against a shoulder formed by an enlarged portion 415 of the slide 406. Referring to FIG. 10, the end assembly 401 is held by a collar 417 secured by conventional means such as a washer 419 and a nut 421 threaded on spindle 407. As shown in FIG. 10, the groups of convolutions such as 401 comprise pairs of convolutions such as 423 and 425 which have been welded together at their inner peripheries as indicated at 427 and which are to be welded at their outer peripheries as at 429 by the welding tip 431 of an electric welding torch 432. The chill rings such as 433, which are placed in position as described in connection with the preceding operation of inside diameter welding, are left in place to space the convolutions of the bellows properly, and to provide secure clamping thereof.

As shown in FIG. 9, the enlarged portion 415 of the slide 406 has attached thereto a key 435 which is received within a spline 437 in an outer shaft 439. A pulley 441 driven by a belt 443 from a second pulley 445 is secured to shaft 439. Pulley 445 is driven by a weld drive motor WM, which is also shown in FIG. 11.

Formed on the outer end of slide 406 is a rack 449, which is adapted to be driven by a gear 451 at the output of a gear box 453. The gear box drive is supplied by an advance motor AM, also shown in FIG. 11. Motor AM is pivotally mounted by means generally designated as 455 to a suitable frame or the like, and is held in a position in which gear 451 engages the rack by a spring 457, which can be manually compressed when desired for removal of the slide assembly.

Shaft 439 is carried in suitable bearings, generally designated as 459 and 461, which are journalled in a suitable frame 463.

Carried at the outer end of shaft 439, and secured thereto, is a ferromagnetic collar 467, and mounted on a recess therein is a set of electromagnetic coils 469, for purposes to be described. An outer ferromagnetic disc 471 encloses coils 469 and is secured to collar 467, and a ferromagnetic detector plate 475 is secured to disc 471, for purposes to be described. Within coils 469 is mounted a non-magnetic ring 479, of plastic, ceramic or the like.

Referring to FIG. 10, it will be apparent that when a pair of bellows convolutions is in the position closest to detector plate 475, assuming that the bellows convolutions are made of ferromagnetic material, the magnetic circuit surrounding coils 469 will exhibit a minimum reluctance condition. This condition is employed to position the individual convolutions for welding in a manner to be described. A modification, for use with non-ferromagnetic bellows, will also be described.

Referring again to FIG. 9, welding torch 433 is supported by an arm 48 pivoted to a support fixed with respect to frame 463, by conventional means generally designated as 48, for movement between a retracted position and a welding position, the latter being adjusted by means of a set-screw 485 mounted in a suitable bracket 487 and used in conjunction with a second set screw holding torch 432 in arm 48 to set the vertical and horizontal position of the torch.

In FIG. 11, the control circuits for the advance motor AM and the weld motor WM of the apparatus of FIGS. 9 and 10 are shown. Referring first to weld motor WM, this may be a conventional split phase alternating current motor having a first winding 491 connected to a source of alternating voltage through a suitable phasing capacitor 493. Motor WM has a second winding 495 connected for energization by an amplifier 497 with a first phase or an opposite phase depending on the phase of the input voltage applied to the amplifier.

The output shaft of motor WM drives pulley 445, and also drives a tachometer generator 499 which produces an alternating voltage having a magnitude proportional to the speed of rotation and having a frequency equal to the frequency of the supply source applied to its input winding 501, which may be the source supplying motor WM.

The output winding 503 of generator 499 is connected in series with a spring-returned push button PB, which in turn is connected in parallel with a circuit controller C2, to be described, and the circuit is completed to the other input terminal of amplifier 497 through a portion of a resistor 505 selected by an adjustable wiper 507. Resistor 505 is energized by an alternating voltage of the same frequency as that applied to the motor WM through a suitable transformer 509. It will be appreciated by those skilled in the art that this arrangement will operate such that when push button PB is depressed or circuit controller C2 is closed, motor WM will run at a speed determined by the setting of wiper 507 on potentiometer 505. This speed will be adjusted to give a rate of welding suited to the material of which the bellows is made.

Motor WM drives circuit controllers C2, C3 and C4 through a pair of gears 511 and 513 so proportioned that the circuit controller wipers make one revolution for each one and one-half revolutions of the weld motor WM. This ratio is not critical, but should be sufficient to provide enough overlap to ensure a complete weld. In some instances, for example, an extra quarter revolution, or less, would be sufficient.

Circuit controller C2 has a conductive segment 515, which is interrupted at a reference position of the weld motor, and which completes a circuit for the operation of the weld motor in all other positions, such that once started by a momentary depression of push button PB, the motor will continue to operate through one and one-half revolutions, and then stop until the push button is again depressed.

Circuit controller C4 is identical to circuit controller C3, and, as will be seen from FIG. 11, it completes a circuit from a battery 517 to energize the welder schematically indicated at 519 when the weld motor WM is in operation.

Circuit controller C3 has a wiper generally designated at 521 carrying an outer conductive segment 523 and an inner conductive segment 525 insulated from the outer segment. Segment 525 contacts a segment 527 during operation of the motor, to complete a stick circuit for a slow release relay R over its front contact a. A pickup circuit for relay R is completed during the operation of the motor WM by the engagement of conductive segment 525 with a contact 529. The circuit for relay R is completed through a battery 531, as shown.

As schematically indicated, relay R is of the type which will pick up relatively quickly, but which is slow to release. Thus, its front contacts a and b will remain closed for a short time after the motor has stopped, and will then release to close back contact c.

Motor AM may be of the same type as motor WM, and as here shown has a first winding 533 energized through a suitable phasing capacitor 535, and a second winding 537 connected to the output of an amplifier 539 to be energized by a voltage of a first or an opposite phase depending on the phase of the voltage input of the amplifier. A tachometer generator 541 having a supply winding 543 and an output winding 545 is arranged to be driven by the shaft of motor AM, corresponding to the similar generator 499 driven by the weld motor WM.

The control circuit for amplifier 539 extends from the upper input terminal to a pair of contacts 547 and 549, which are adapted to be bridged by conductive segment 523 of wiper 521 in the reference position of motor WM, thence over front contact b of relay R to a manual switch 551 if relay R is energized, or over back contact c of relay R and through a secondary winding 555, comprising one of windings 469, to switch 551. From switch 551, the circuit extends through the secondary winding 557 of a transformer 553 and output winding 545 of generator 541 to the lower input terminal of amplifier 539. The primary winding of transformer 553 is energized from a suitable source of alternating current, preferably the same source supplying motor AM and generator 541.

Coils 469 have been shown schematically as comprising the windings of a variable core transformer. Referring to FIG. 10, the variation of the core is brought about by the movement of the bellows convolutions with respect to detector plate 475, with an accompanying variation in the effective air gap in the magnetic circuit surrounding the coils. Thus, comparing FIGS. 10 and 11, when the edges of confronting convolutions, which abut to form a seam to be welded, are slightly beyond the proper positioning for welding, the reluctance of the magnetic circuit will be a minimum, and the voltage induced in secondary winding 555 will be a maximum. Winding 555 is phased with respect to winding 557 such that the voltages across the windings are in phase opposition, and the voltages are so proportioned in magnitude that the voltage across winding 555 is slightly greater at its maximum than the constant voltage across winding 557. The phase of the voltage across winding 557 is selected to cause motor AM to drive spindle 407 to the right in FIG. 9. Thus, once one pair of convolutions moves slightly past the detector plate 475, the spindle will be driven to the right until the next pair is in welding position, and any overtravel is corrected by a reverse movement of the spindle.

If desired, push button PB can be replaced by a single throw manual switch in series with a back contact of a relay energized by an amplifier in parallel with amplifier 539, such that once the switch is closed, the weld cycle will be repeated automatically until the switch is again opened.

The operation of the portion of the apparatus of my invention shown in FIGS. 9–11 will now be described. First, assume that switch 551 is open, weld motor WM is in its reference position, and spindle 407 has been loaded with assemblies to be welded in the manner shown in FIG. 9 and be described above. Initially, the spindle will be positioned with the first pair of convolutions to be welded just past the detector plate 475. Relay R will be in its deenergized position at the start of the operation, since weld motor WM is initially stopped in its reference position. Also, contacts 547 and 549 will be bridged by conducting segment 523 on wiper 521. Operation is begun by closing manual switch 551. A circuit will then be completed from the upper input terminal of amplifier 539, over contacts 549 and 547 through segment 523, over back contact c of relay R, and through secondary winding 555, switch 551, secondary winding 557 and output winding 545 of generator 541 to the lower input terminal of amplifier 539. Since the voltage across winding 555 is lower than that across winding 557 except when a seam between the outer diameters of a pair of convolutions is aligned with detector plate 475, the net input signal to the amplifier will be of the phase of the voltage across winding 557, and motor AM will rotate in the direction to advance spindle 407 until the circuit of amplifier 539 is again balanced by a second pair of convolutions adjacent the detector plate 475.

When motor AM stops, the operator can initiate a welding cycle by depressing push button PB, or, if the alternate circuit described above is employed, the welding cycle will be initiated automatically. In the construction shown, with the push button depressed, the control circuit for amplifier 497 will be completed through the portion of resistor 505 selected by wiper 507, the contacts of the push button, and output winding 503 of generator 499. Motor WM will then rotate shaft 439 in FIG. 9. Once motor WM has passed its reference position, push button PB will be bypassed by circuit controller C2, so that the motor will complete one and one-half revolutions before stopping.

Welder 519 will be energized during the rotation of motor WM through circuit controller C4. During this operation, operation of motor AM, which might occur because of thermal effects which would modify the coupling between coils 469, is prevented by the open circuit between contacts 547 and 549.

At any convenient point in the traverse of wiper 521 of circuit controller C3, contact 529 is grounded through conductive segment 525, causing relay R to pick up. Once picked up, relay R will be held up over its own front contact a and segment 527 of circuit controller C3. At the end of the welding cycle, segment 525 will move out of contact with segment 527, and the stick circuit for relay R will be opened. However, front contact b of relay R will remain closed for a short time, due to the slow release characteristic of relay R. During this interval, motor AM will be advanced by the voltage across secondary winding 557, which is balanced only by the voltage generated across output winding 545 when the motor reaches a prescribed speed. The time delay of relay R is made sufficient to enable the spindle 407 to be advanced beyond the point at which the voltage across winding 555 can balance that across winding 557. When relay R does release, therefore, motor AM will continue to operate until the next pair of convolutions is aligned with detector plate 475.

In the embodiment of the invention shown, when the operator observes that motor AM has stopped, push button PB can be depressed again to initiate another welding cycle. After all of the convolutions of the group 401 in FIG. 10 have been welded in this manner, it will be apparent that the outer rim 561 of the last convolution, which it is not desired to weld, is positioned in alignment with detector plate 475. Since this convolution is followed by chill spacer 409, which will not operate the detector circuit, advance will be continued until the first convolution of the next group 403 reaches the detector plate. Observing this, the operator then raises torch 433 by rotating arm 481, and manipulates push button PB to cause the weld motor WM to go through two cycles of operation without accompanying operation of the welder. After this has been done, the welding torch can be returned to operating position and welding continued until group 403 is completed and the next group is advanced. In this manner, operation can be continued until all of the bellows on spindle 407 are completed. It will be noted that the only operation required of the operator demanding any degree of skill is the positioning of the first convolution; this step can be avoided, if so desired, by operating the unit with the torch raised as described in connection with the welding of the second group of convolutions.

When all of the bellows on spindle 407 have been welded, the spindle is removed and disassembled. The chill rings, such as 433 in FIG. 10, will still be in position, and these may be removed by pushing each one off center enough to project beyond the convolutions of the bellows, cutting it, and bending it free of the bellows.

If non-ferromagnetic bellows are to be welded, the apparatus of FIGS. 9–11 may be modified by eliminating collar 467 and coils 469, and making disc 471 integral with disc 479, both being made of a suitable non-conductor. Detector plate 475 may be made of any suitable conducting material. By making an electrical connection to detector plate 475 and another to shaft 439 or other suitable part of the apparatus or the frame therefor, a capacitor is formed having a higher capacitance when a pair of convolutions is aligned with the detector plate than when the convolutions are not aligned. This capacitor can be connected in a bridge circuit controlling an amplifier, and the amplifier output would take the place of winding 555 in FIG. 11.

While I have described one embodiment of my invention in detail, it will be apparent to those skilled in the art upon reading my description that many changes and variations could be made, and such can obviously be made without departing from the scope of my invention.

Having thus described my invention, what I claim is:

1. Automatic apparatus for welding a circular seam formed at the junction of two confronting elements, comprising, in combination, welding means, advancing means operable when actuated to move one of a succession of pairs of confronting elements into a welding position in which a portion of the seam at the junction of the elements is in welding proximity to the welding means, clamping means engaging each pair of elements in welding position about their entire peripheries to hold the seam in a fixed plane during welding, means for actuating the welding means to weld the seam, and means controlled by said actuating means after completion of each welding to actuate said advancing means to move the welded elements out of welding position and to move the next succeeding pair into welding position.

2. Automatic welding apparatus, comprising, in combination, a welding torch, means for moving a pair of confronting elements having a junction forming a circular seam to be welded along the axis of the seam to a welding position in which the seam is in welding proximity to the torch, means for rotating said elements about the axis of the seam, ring means for clamping said elements together about their entire peripheries to maintain the seam in a fixed plane during welding, and means actuated by said rotating means for energizing said torch to weld said seam.

3. Apparatus for welding the external seams formed between confronting bellows convolutions, comprising, in combination, a slide comprising a rack and a spindle, means for securing groups of convolutions to be welded to form bellows on said spindle, a welding torch mounted adjacent said spindle, means for driving said rack to advance convolutions on said spindle past said torch, and means responsive to the position of said convolutions with respect to said torch for controlling said driving means to stop each confronting pair of convolutions having a seam to be welded in a position to be welded by said torch.

4. Automatic welding apparatus, comprising, in combination, a welding torch; a spindle having a longitudinal axis adjacent said torch; means for mounting a group of elements, confronting to form circular seams to be welded, on said spindle with said seams coaxial with the longitudinal axis of said spindle, said longitudinal axis being so positioned as to place a seam on said spindle in welding relation to said torch when adjacent said torch; means operable when actuated for rotating said spindle about its longitudinal axis through a predetermined angle comprising at least a full revolution; means controlled by said rotating means for energizing said torch; and means controlled by said rotating means after completing a rotation for advancing said spindle to a position in which an unwelded seam is in welding relation to said torch.

5. Automatic welding apparatus, comprising, in combination, a welding torch; a spindle having a longitudinal axis adjacent said torch; means for mounting a group of elements, confronting to form circular seams to be welded, on said spindle with said seams coaxial with the longitudinal axis of said spindle, said longitudinal axis being so positioned as to place a seam on said spindle in welding relation to said torch when adjacent said torch; means operable when actuated for rotating said spindle about its longitudinal axis through a predetermined angle comprising at least a full revolution; means controlled by said rotating means for energizing said torch; means actuated by said rotating means at the end of a rotation for advancing said spindle; and means responsive to the position of said seams relative to said torch for stopping said spindle with an unwelded seam in welding relation to said torch.

6. In automatic welding apparatus, a slide having a longitudinal axis and a rack formed at one end, a spindle formed at an opposite end, and an intermediate guide portion; an outer shaft concentric with said slide, said shaft being journaled for rotation about said longitudinal axis and keyed to said guide portion for relative axial motion without relative rotation; means for rotating said outer shaft; means engaging said rack for moving said slide along its longitudinal axis; means for mounting a plurality of elements abutting to form seams to be welded on said spindle; welding means mounted adjacent said spindle, and means controlled by the position of said seams relative to said welding means for actuating said rack engaging means to position one of said seams in welding relation to said welding means.

7. Automatic welding apparatus, comprising, a welding torch, a spindle, means for mounting a series of parts to be welded on said spindle, means mounting said spindle for translation along an axis located adjacent said torch to carry said parts successively into welding relation with said torch, and means responsive to the position of the nearest of said parts for advancing said spindle along said axis to a position in which one of said parts is in welding relation to said torch.

8. Apparatus for welding together the confronting outer peripheries of a series of circular bellows convolutions, each having a central aperture, to form a bellows, comprising, a spindle, means for mounting said series on said spindle with the spindle extending through the central apertures of said convolutions to make the outer peripheries of said convolutions coaxial with the longitudinal axis of said spindle, means mounting said spindle for rotation about and translation along its longitudinal axis, a welding torch mounted adjacent said spindle in a position to weld the outer peripheries of a pair of confronting convolutions when in a predetermined position along said longitudinal axis, means operable when actuated to rotate said spindle through a predetermined angle comprising at least a full revolution, means controlled by said rotating means for energizing said torch, means actuated by said rotating means at the end of each rotation for advancing said spindle, and means controlled by the position of said convolutions relative to said torch for terminating the operation of said advancing means when a pair of convolutions is in position to be welded.

9. In apparatus for welding together the inner peripheries of pairs of circular plates having circular central apertures, comprising, in combination, a spindle on which pairs of plates can be stacked, escapement means associated with said spindle for removing a pair of plates from said spindle when actuated, a welding turret, a slide, comprising means for holding a pair of plates, mounted for movement between a first position in which said holding means is adapted to receive a pair of plates from said escapement and a second position in which said holding means is within said turret, means controlled by said slide for actuating said escapement in the first position of said slide, and means actuated when said slide is in its second position for removing a pair of plates from said holding means and securing them in said turret.

10. Apparatus for welding together the inner peripheries of pairs of circular plates having circular central apertures, comprising, in combination, a magazine for holding a plurality of pairs of plates, a welding turret rotatable about an axis, means for transferring a pair of plates from said magazine to said turret, means for securing said plates in said turret with the central apertures of said plates coaxial with the axis of rotation of said turret, means controlled by said transferring means for rotating said turret through a predetermined angle comprising at least a full revolution, a welding torch mounted in position to weld the inner peripheries of plates mounted in said turret, and means controlled by said rotating means for energizing said torch during said rotation.

11. Automatic welding apparatus, comprising, in combination, a slide having an arcuate land formed at one end thereof for supporting a pair of circular plates having circular central apertures of predetermined size; a welding turret comprising a first member journalled for rotation about a central axis and provided with an axial bore, a first annular chill formed at one end coaxial with said bore, and a transverse opening adjacent to said first chill and adapted to receive said slide, a second member comprising a shaft within said bore and provided with a coaxial bore, said second member formed at one end with a second annular chill, means resiliently biasing said second member to engage said second chill with said first chill to clamp a pair of circular plates having central circular apertures of said predetermined size for welding together the inner peripheries thereof, and a spindle slidably received within the bore in said second member; a welding torch mounted adjacent said first chill in position to weld the inner peripheries of plates held between said chills; means mounting said slide for reciprocation between a loading position and a second position in which said arcuate land is within said transverse opening in position to support a pair of plates coaxial with said central axis, means for depositing a pair of plates on said land at each return of the slide to its loading position, means actuated when said slide is in its second position for moving said spindle through said transverse opening and through the central apertures of a pair of plates on said land to retain said plates when said slide returns to its loading position, means actuated when said slide approaches said transverse opening for moving said second member away from said opening to clear the opening and release plates clamped between said chills, means on said slide for pushing released plates out of said opening ahead of said slide, means actuated during the travel of said slide from its second position to its loading position for returning said second member to clamp plates held on said spindle between said chills, means for moving said spindle out of said transverse opening when said second member is in clamping position, means actuated when said slide is out of said turret for rotating said turret about its central aperture and energizing said torch, and means for alternately moving said slide between its loading position and its second position.

12. In combination, a rotatable welding turret, means operable when actuated for rotating said turret through a predetermined angle, a welding torch mounted in position to weld a seam in the form of a circular arc between confronting parts mounted in said turret during said rotation, reciprocating slide means for successively loading and unloading parts from said turret, means operated by said slide means after loading of said turret for actuating said rotating means, and means operated by said rotating means for energizing said torch during said rotation.

13. In automatic welding apparatus, a welding turret comprising means for clamping parts in position for welding, a loading port in said turret, a magazine of parts to be welded, slide means reciprocating between said magazine and said loading port for supplying parts to be welded to said loading port, means controlled by said slide means for removing welded parts from said clamping means, and means actuated in a predetermined portion of said slide means for transferring parts to be welded from said loading port to said clamping means.

14. Apparatus of the class described, comprising, in combination, a slide, means for moving said slide alternately on a forward stroke from a first position to a second position and on a return stroke from the second position to the first position, means on said slide for supporting a pair of parts confronting to form a seam to be welded, means actuated in the first position of the slide for depositing a pair of parts on the slide, a welding turret, means actuated in the second position of the slide for removing the pair from the slide and clamping them in the turret; means actuated during the return stroke for welding the parts in the turret, means controlled by said welding means for delaying the forward stroke until the welding is completed, and means actuated during the forward stroke for removing the welded parts from the turret.

15. Automatic apparatus for welding together the circular inner peripheries of a pair of bellows convolutions, comprising, in combination, a slide adapted to carry a pair of bellows convolutions to be welded, means for moving said slide alternately between a first position and a second position, means actuated in the first position of the slide for depositing a pair of convolutions to be welded on said slide, a welding turret, means actuated in the second position of the slide for removing the pair from the slide and clamping them in the turret, means actuated during the movement of said slide from its second position to its first position for welding the inner peripheries of the pair of convolutions in the turret, means actuated by said welding means for interrupting the operation of said moving means to prevent the return of said slide from its first position to its second position until the welding is completed, and means actuated during the movement of the slide from its first position to its second position for removing the welded pair from the turret.

16. Welding apparatus, comprising a welding turret rotatable about a central axis, a welding torch operatively associated with said turret to weld the inner peripheries of a pair of bellows convolutions clamped therein, clamping means in said turret movable between a non-clamping position and a clamping position, means mounted within said turret and operable to hold a pair of convolutions in position for clamping, a magazine for storing pairs of convolutions to be welded, slide means for transferring a pair of convolutions from said magazine to said turret, said slide means being movable from a first position to a second position, an escapement operable to transfer a pair of convolutions from said magazine to said slide means in its first position, means operable when actuated for rotating said turret through one and one-half revolutions, means actuated during said rotation for energizing said torch, means actuated after said rotation for operating said slide means from its first position to its second position to transfer a pair of convolutions to said turret, means actuated at the end of the transfer to actuate said holding means, means for moving said slide means back to its first position, means actuated during said movement for actuating said turret rotating means, and means for actuating said escapement when said slide means returns to its first position.

17. Apparatus for welding the external seams formed between confronting bellows convolutions, comprising, in combination, a slide comprising a rack and a spindle, means for securing convolutions to be welded on said spindle comprising a series of chill rings disposed between adjacent pairs of convolutions confronting to form seams to be welded and engaging each convolution along its entire periphery in proximity to the seam formed by it with the adjacent convolution, a welding torch mounted adjacent said spindle, means for driving said rack to advance convolutions on said spindle past said torch, means for generating an electrical signal in accordance with the distance of each seam formed by a confronting pair of convolutions approaching the torch, and means responsive to said signal for controlling said driving means to stop the convolutions with the seam in position to be welded by said torch.

References Cited in the file of this patent
UNITED STATES PATENTS 2,798,146     November _____ July 2, 1957

UNITED STATES PATENT OFFICE
CERTIFICATE OF CORRECTION

Patent No. 3,100,256                      August 6, 1963

Sune Edward Borg

It is hereby certified that error appears in the above numbered patent requiring correction and that the said Letters Patent should read as corrected below.

Column 5, line 25, for "rock" read -- rack --; column 6, line 29, for "285" read -- 235 --; column 7, line 12, for "up" read -- by --; column 9, line 13, for "48" read -- 483 --; column 10, line 44, for "positioning" read -- position --.

Signed and sealed this 7th day of April 1964.

(SEAL)
Attest:

ERNEST W. SWIDER
Attesting Officer

EDWARD J. BRENNER

Commissioner of Patents